(12) United States Patent
Wang

(10) Patent No.: US 10,479,254 B2
(45) Date of Patent: Nov. 19, 2019

(54) TRACKED DUMPING COMPARTMENT AND A DUMP TRUCK USING SAID TRACKED DUMPING COMPARTMENT

(71) Applicant: Shandong Girou Automobile Refitting Co., Ltd., Yantai (CN)

(72) Inventor: Dongwen Wang, Penglai (CN)

(73) Assignee: Shandong Girou Automobile Refitting Co., Ltd. (CN)

( * ) Notice: Subject to any disclaimer, the term of this patent is extended or adjusted under 35 U.S.C. 154(b) by 66 days.

(21) Appl. No.: 15/760,144

(22) PCT Filed: Nov. 11, 2016

(86) PCT No.: PCT/CN2016/000627
§ 371 (c)(1),
(2) Date: Mar. 14, 2018

(87) PCT Pub. No.: WO2017/080100
PCT Pub. Date: May 18, 2017

(65) Prior Publication Data
US 2018/0251061 A1  Sep. 6, 2018

(30) Foreign Application Priority Data

Nov. 10, 2015 (CN) .......................... 2015 1 0756044
Dec. 18, 2015 (CN) .......................... 2015 1 0949508

(51) Int. Cl.
*B60P 1/36* (2006.01)
*B60P 1/38* (2006.01)

(52) U.S. Cl.
CPC .. *B60P 1/38* (2013.01); *B60P 1/36* (2013.01)

(58) Field of Classification Search
CPC ..................................... B60P 1/36; B60P 1/38
(Continued)

(56) References Cited

U.S. PATENT DOCUMENTS 1,722,106 A    7/1929  Frederick et al.
3,481,647 A *  12/1969 Cook ........................ B60P 1/36
                                                  298/1 B
(Continued)

FOREIGN PATENT DOCUMENTS

CN    201961210 U    9/2011
CN    103950402 B    4/2015
(Continued)

OTHER PUBLICATIONS

International Search report for PCT/CN2016/000627 dated Feb. 22, 2017.

*Primary Examiner* — Stephen T Gordon
(74) *Attorney, Agent, or Firm* — Lerner, David, Littenberg, Krumholz & Mentlik, LLP

(57) ABSTRACT

A tracked dumping compartment including frame cross members and frame rails, a guide rail fixed on the frame cross members, and said guide rail supporting a chain; the chain includes inner link plates, outer link plates, rollers and pins, the rollers rollingly fit to the guide rail; carrier plates are fixed on irregularly shaped outer link plates, and a rubber track is fixed on the carrier plates; blocking plates are fixed on the frame cross members and frame rails, the blocking plates including a first angled section and a vertical section, the rubber track positioned below the first angled sections and between the vertical sections, the angle between the first angled sections and the top surface of the rubber track being 30°-70°, and the width of the rubber track when in a free state being less than or equal to the distance between the vertical sections.

8 Claims, 8 Drawing Sheets

(58) Field of Classification Search
USPC ............ 298/1 B, 1 V, 27; 105/239; 414/327,
414/527, 528; 198/844.1, 845, 849–851,
198/853
See application file for complete search history.

(56) References Cited

U.S. PATENT DOCUMENTS

| | | | |
|---|---|---|---|
| 3,731,825 A | 5/1973 | Holland et al. | |
| 5,437,499 A * | 8/1995 | Musso | B60P 1/28 298/1 B |
| 2004/0001749 A1 * | 1/2004 | Vanberlo | B60P 1/38 414/528 |

FOREIGN PATENT DOCUMENTS

| | | |
|---|---|---|
| CN | 204567399 U | 8/2015 |
| CN | 204567400 U | 8/2015 |
| CN | 105346426 A | 2/2016 |
| CN | 105365645 A | 3/2016 |
| CN | 205273249 U | 6/2016 |
| CN | 205381181 U | 7/2016 |

* cited by examiner

TRACKED DUMPING COMPARTMENT AND A DUMP TRUCK USING SAID TRACKED DUMPING COMPARTMENT

CROSS REFERENCE TO RELATED APPLICATIONS

The present application is a national phase entry under 35 U.S.C. § 371 of International Application No. PCT/CN2016/000627, filed Nov. 11, 2016, which claims priority from Chinese Patent Application Nos. 201510949508.0 filed Dec. 18, 2015 and 201510756044.1 filed Nov. 10, 2015, all of which are hereby incorporated herein by reference.

TECHNICAL FIELD

The present invention relates to the technical field of transport vehicles, and in particular to a tracked dumping compartment and a dump truck using said tracked dumping compartment.

PRIOR ART

The applicant disclosed a dump semitrailer in the earlier patent publication numbered CN103950402B. The dumping compartment of the dump semitrailer comprises a movable bed. The unloading device is a crawler moving mechanism. During initial unloading of bulk cargoes, the movable bed does not turn over, the rubber track of the unloading device and the movable bed make a relative movement, a clearance inevitably exists between the rubber track and the movable bed, and some of the bulk cargoes may leak from the clearance between the fixed side plate and the movable side plate. This not only causes a loss of cargoes, but more importantly, contaminates the transmission components below the movable bed to affect the stability and reliability of the whole dumping compartment.

The applicant disclosed a guide rail for a dump semitrailer and a chain working together with the guide rail in the earlier patent publication numbered CN204567400U. Since the guide rail is laid at the front and rear of the whole frame, the distance is relatively long. The guide rail is usually welded to the frame. Thermal deformation is inevitable during welding, and thus slight wavelike deformations inevitably occur to the guide rail. In addition, since the load capacity of such a dump semitrailer is very large, slight deformations also inevitably occur to the front and rear of the frame subsequently. Moreover, because of the wear in the up and down directions of the guide rail with a circular cross-section, the lower edge of the inner link plate will interfere with the frame cross members and get stuck so that it cannot work normally.

SUMMARY OF THE INVENTION

The present invention is intended to provide a tracked dumping compartment and a dump truck using the tracked dumping compartment to overcome the above-mentioned technical problems.

The technical solutions disclosed in the present invention are as follows:

A tracked dumping compartment comprising frame cross members and frame rails, wherein a guide rail is fixed on the frame cross members, the guide rail supporting a chain, the chain comprising inner link plates, outer link plates, rollers, and pins, the outer link plates being divided into two types: conventional outer link plates and irregular outer link plates with a plate lug, wherein more than one conventional outer link plate is set between two irregular outer link plates, the circumferential excircle of the rollers of the chain is located within the upper and lower edges of the inner link plates, conventional outer link plates and irregular outer link plates, the rollers rotationally fit to the guide rail, carrier plates are fixed on the irregular outer link plates, and a rubber track is fixed on the carrier plates, characterized in that: blocking plates are fixed on said frame cross members and frame rails, said blocking plate comprising first angled sections and vertical sections, the rubber track being positioned below the angled sections and between the vertical sections, the included angle between the first angled sections and the top surface of the rubber track being 30° to 70°, and the width of the rubber track in a free state being less than or equal to the distance between the vertical sections. A further preferred solution is that the included angle α between the first angled sections (82) and the top surface of the rubber track (35) is 45°. With this technical solution, a clearance exists between the rubber track (35) and the vertical sections (81), and thus the friction force is smaller so it is easier for the rubber track to move. The purpose of setting the first angled sections (82) is to prevent larger materials from entering the clearance between the first angled sections (82) and the top surface of the rubber track (35). For any smaller materials that can enter the clearance between the first angled sections (82) and the top surface of the rubber track (35), since the clearance between the first angled sections (82) and the top surface of the rubber track (35) is in the shape of a horn during the movement of the rubber track (35), the possibility of these materials entering a narrower place is lower than the possibility of them entering a wider place and thus, as the rubber track (35) moves, the majority of materials will not leak to the outside. In addition, as there is more than one layer of the rubber track (35), the probability of leakage is even lower.

A tracked dumping compartment comprising frame cross members and frame rails, wherein a guide rail is fixed on the frame cross members, the guide rail supporting a chain, the chain comprising inner link plates, outer link plates, rollers, and pins, the outer link plates being divided into two types: conventional outer link plates and irregular outer link plates with a plate lug, wherein more than one conventional outer link plate is set between two irregular outer link plates, the circumferential excircle of the rollers of the chain is located within the upper and lower edges of the inner link plates, conventional outer link plates and irregular outer link plates, the rollers rotationally fit to the guide rail, carrier plates are fixed on the irregular outer link plates, and a rubber track is fixed on the carrier plates, characterized in that: the distance between the bottom and top of said guide rail being greater than the distance between the inner link plates on the two sides of rollers, and the maximum width of the part of the guide rail which extends between inner link plates being less than the distance between inner link plates.

Said blocking plate further comprises a second angled section supporting the rubber track, and the included angle between the second angled section and the bottom surface of the rubber track is 0° to 90°. In fact, if no second angled section (83) is set, that is to say, the included angle between the second angled section and the bottom surface of the rubber track is 90°, the rubber track (35) is supported by carrier plates and will not fall. The second angled section (83) not only can support the rubber track (35), but also further enhance the leak prevention function. A further preferred solution is that the included angle β between said second angled sections (83) and the bottom surface of the rubber track is 0°.

Further, the rubber track located anywhere below the angled sections and between the vertical sections comprises at least three overlapped rubber tracks, that is to say, one end of any of the rubber tracks is fixed on the corresponding carrier plate with screws, and the free end travels beyond the carrier plate which is two carrier plates away from the free end and is put on the carrier plate which is three carrier plates away from the free end when moving over the top of the drive chain. If the solution is adopted, not only is the leak prevention function enhanced, but also the carrying capacity is increased.

Further, a plurality of powerless short rollers supporting the rubber track are set on said second angled sections. If the solution is adopted, sliding friction between the bottom surface of the rubber track (35) and the second angled sections (83) is changed to rolling friction, which helps to reduce the power consumption.

Further, the cross-section of said guide rail is in the shape of any of a circle, rectangle, isosceles triangle, isosceles trapezoid, pentagon, semi-oblong, semi-ellipse, spindle, and bullet.

A dump truck, comprising the tracked dumping compartment in any of the above-mentioned technical solutions.

Compared with the prior art, the present invention is structurally simple and thoroughly eliminates leaks from the bottom. In addition, the bending strength of the guide rail is so high that flexural deformations do not easily happen in the front and rear directions. Moreover, the distance between the inner link plates and the frame cross members is raised so that the lower edge of inner link plates will not easily interfere with the frame cross members.

PARTICULAR EMBODIMENTS

Figure 1:
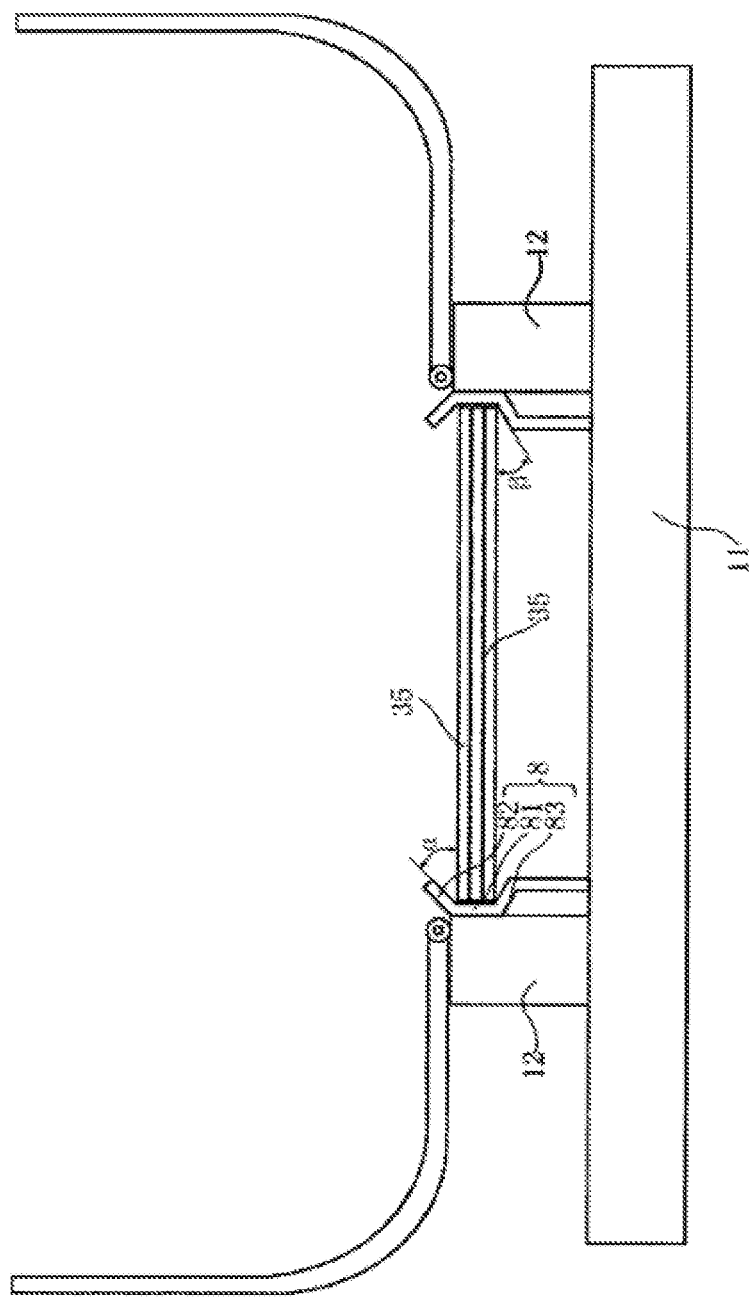
FIG. 1 shows the structure of embodiment 1 of the present invention.
Figure 2:
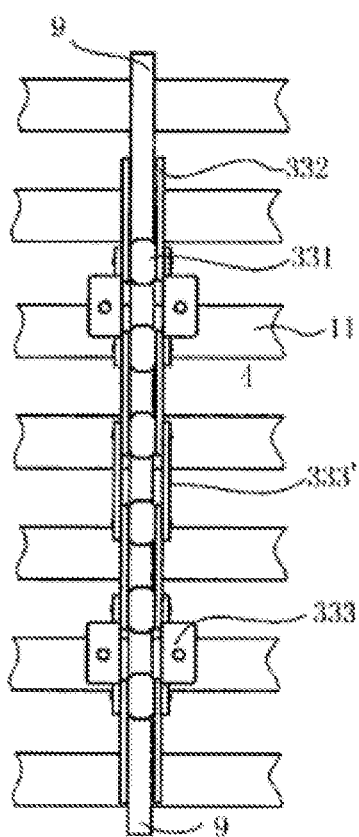
FIG. 2 shows the mating relationship between the guide rail and the chain of the present invention.

Embodiment 1. See FIG. 1 and FIG. 2

A tracked dumping compartment comprises frame cross members (11) and frame rails (12), wherein a guide rail (9) is fixed on the frame cross members (11), the guide rail (9) supporting a chain (33), the chain (33) comprising inner link plates (332), outer link plates, rollers (331), and pins, the outer link plates being divided into two types: conventional outer link plates (333') and irregular outer link plates (333) with a plate lug, wherein more than one conventional outer link plate is set between two irregular outer link plates (333), the circumferential excircle of the rollers (331) of the chain is located within the upper and lower edges of the inner link plates (332), conventional outer link plates, and irregular outer link plates (333), the rollers (331) rotationally fit to the guide rail (9), carrier plates are fixed on the irregular outer link plates (333), a rubber track (35) is fixed on the carrier plates, and blocking plates (8) are fixed on said frame cross members (11) and frame rails (12), said blocking plate comprising first angled sections (82) and vertical sections (81), the rubber track (35) being positioned below the angled sections (82) and between the vertical sections (81), the included angle α between the first angled sections (82) and the top surface of the rubber track (35) being 45°, and the width of the rubber track (35) in a free state being 2 mm less than the distance between the vertical sections (81). The bottom surface of the rubber track (35) is supported by carrier plates and will not fall. The rubber track (35) located anywhere between the vertical sections (81) comprises at least three overlapped rubber tracks (35), that is to say, one end of any of the rubber tracks (35) is fixed on the corresponding carrier plate with screws, and the free end travels beyond the carrier plate which is two carrier plates away from the free end and is put on the carrier plate which is three carrier plates away from the free end when moving over the top of the drive chain.

Embodiment 2. See FIG. 1 and FIG. 2

The others are the same as embodiment 1, except that said blocking plate (8) further comprises a second angled section (83) supporting the rubber track (35) and the included angle β between the second angled section (83) and the bottom surface of the rubber track (35) is 30°. The second angled section (83) can not only support the rubber track (35), but also further enhance the leak prevention function.

Embodiment 3. See FIG. 1 and FIG. 2

The others are the same as embodiment 1, except that said blocking plate (8) further comprises a second angled section (83) supporting the rubber track (35) and the included angle β between the second angled section (83) and the bottom surface of the rubber track (35) is 0°. That is to say, the bottom surface of the rubber track (35) is supported by a horizontal boss.

Embodiment 4. See FIG. 1 and FIG. 2

The others are the same as embodiment 2 or embodiment 3, except that a plurality of powerless short rollers supporting the rubber track (35) is set on said second angled sections (83). If the solution is adopted, sliding friction between the bottom surface of the rubber track (35) and the second angled sections (83) is changed to rolling friction, which helps to reduce the power consumption.

Figure 3:
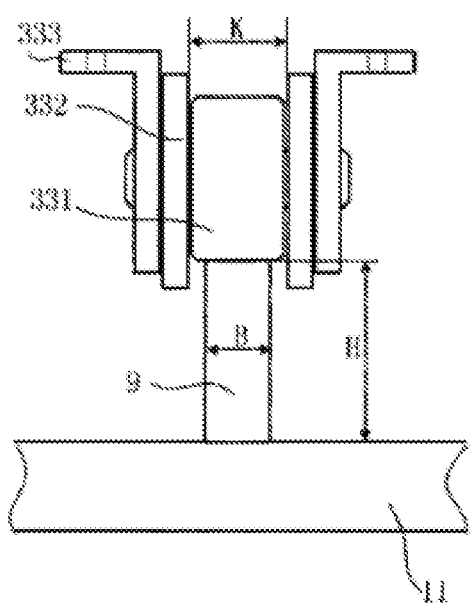
FIG. 3 shows the structure of embodiment 5 of the present invention.

Embodiment 5. See FIG. 2 and FIG. 3

A tracked dumping compartment comprises frame cross members (11) and frame rails (12), wherein a guide rail (9) is fixed on the frame cross members (11), the guide rail (9) supporting a chain (33), the chain (33) comprising inner link plates (332), outer link plates, rollers (331), and pins, the outer link plates being divided into two types: conventional outer link plates (333') and irregular outer link plates (333) with a plate lug, wherein more than one conventional outer link plate is set between two irregular outer link plates (333), the circumferential excircle of the rollers (331) of the chain is located within the upper and lower edges of the inner link plates (332), conventional outer link plates, and irregular outer link plates (333), the rollers (331) rotationally fit to the guide rail (9), carrier plates are fixed on irregular outer link plates (333), and a rubber track (35) is fixed on the carrier plates, characterized in that: the distance H between the bottom and top of said guide rail (9) being greater than the distance K between the inner link plates (332) on the two sides of rollers (331), and the maximum width B of the part of the guide rail (9) which extends between inner link plates (332) being less than the distance K between inner link plates (332). The cross-section of said guide rail (9) is in the shape of a rectangle.

Figure 4:
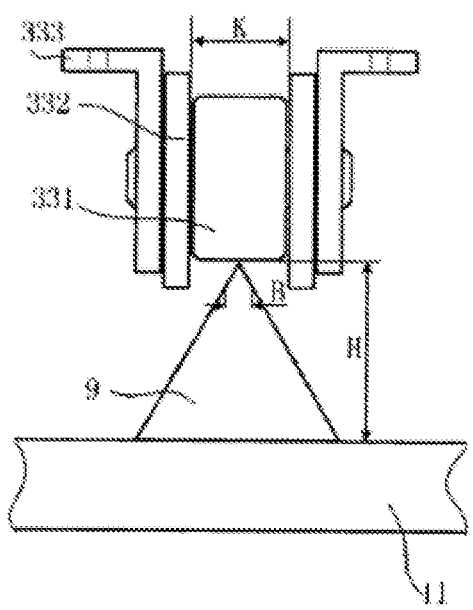
FIG. 4 shows the structure of embodiment 6 of the present invention.

Embodiment 6. See FIG. 2 and FIG. 4

The others are the same as embodiment 5, except that the cross-section of said guide rail (9) is in the shape of an isosceles triangle.

Figure 5:
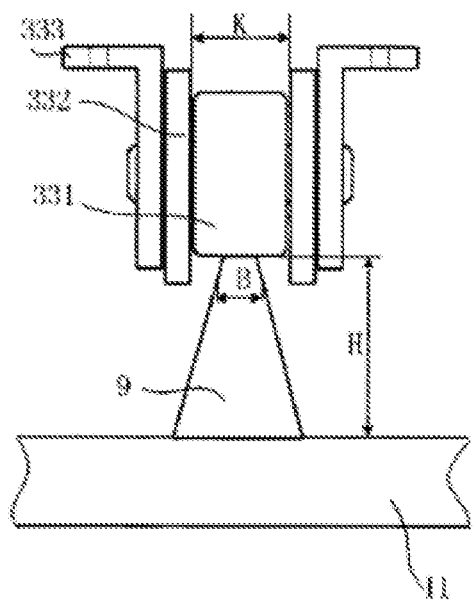
FIG. 5 shows the structure of embodiment 7 of the present invention.

Embodiment 7. See FIG. 2 and FIG. 5

The others are the same as embodiment 5, except that the cross-section of said guide rail (9) is in the shape of an isosceles trapezoid.

Figure 6:
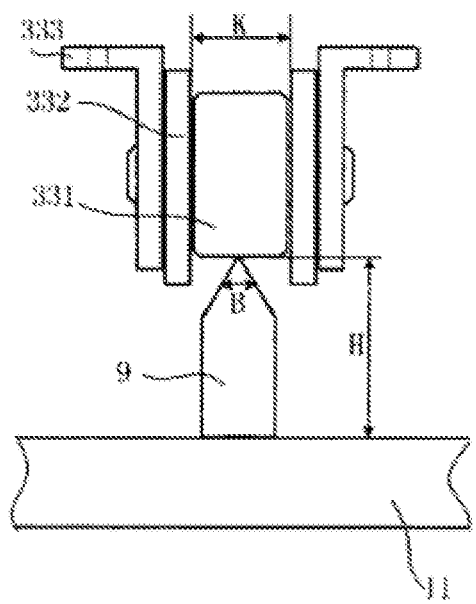
FIG. 6 shows the structure of embodiment 8 of the present invention.

Embodiment 8. See FIG. 2 and FIG. 6

The others are the same as embodiment 5, except that the cross-section of said guide rail (9) is in the shape of a pentagon.

Figure 7:
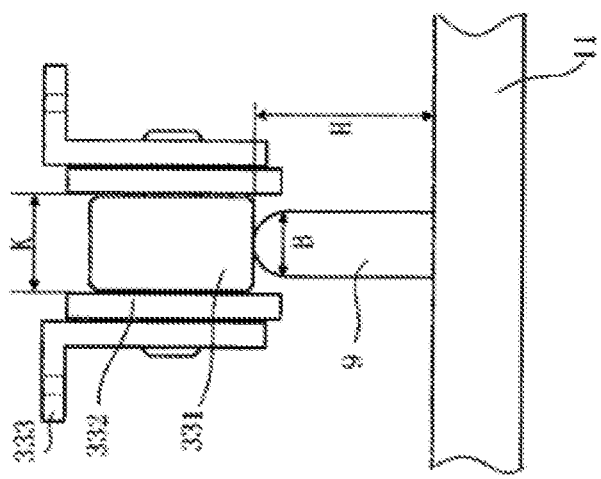
FIG. 7 shows the structure of embodiment 9 of the present invention.

Embodiment 9. See FIG. 2 and FIG. 7

The others are the same as embodiment 5, except that the cross-section of said guide rail (9) is in the shape of a semi-oblong.

Figure 8:
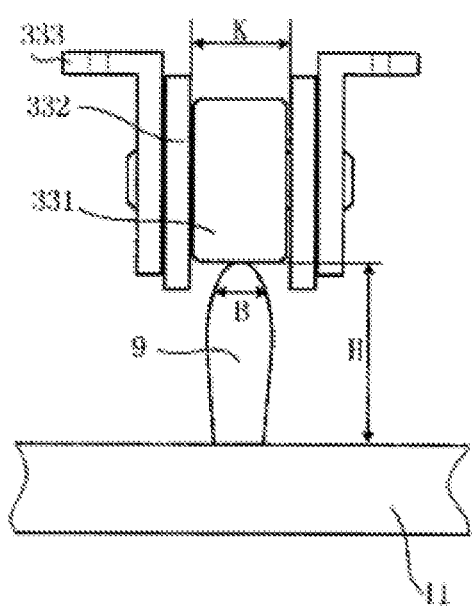
FIG. 8 shows the structure of embodiment 10 of the present invention.

Embodiment 10. See FIG. 2 and FIG. 8

The others are the same as embodiment 5, except that the cross-section of said guide rail (9) is in the shape of a bullet.

The invention claimed is:

1. A tracked dumping compartment comprising frame cross members and frame rails, wherein a guide rail is fixed on the frame cross members, the guide rail supporting a chain, the chain comprising inner link plates, outer link plates, rollers, and pins, the outer link plates being divided into two types: conventional outer link plates and irregular outer link plates with a plate lug, wherein more than one of the conventional outer link plates is set between two of the irregular outer link plates, a circumferential excircle of the rollers of the chain is located within upper and lower edges of the inner link plates, the conventional outer link plates, and the irregular outer link plates, the rollers rotationally fit to the guide rail, carrier plates are fixed on the irregular outer link plates, and a rubber track is fixed on the carrier plates, characterized in that: blocking plates are fixed on said frame cross members and frame rails, said blocking plates comprising first angled sections and vertical sections, the rubber track being positioned below the angled sections and between the vertical sections, an included angle between the first angled sections and a top surface of the rubber track being 30° to 70°, and a width of the rubber track in a free state being less than or equal to a distance between the vertical sections.

2. A tracked dumping compartment comprising frame cross members and frame rails, wherein a guide rail is fixed on the frame cross members, the guide rail supporting a chain, the chain comprising inner link plates, outer link plates, rollers, and pins, the outer link plates being divided into two types: conventional outer link plates and irregular outer link plates with a plate lug, wherein more than one of the conventional outer link plates is set between two of the irregular outer link plates, a circumferential excircle of the rollers of the chain is located within upper and lower edges of the inner link plates, the conventional outer link plates, and the irregular outer link plates, the rollers rotationally fit to the guide rail, carrier plates are fixed on the irregular outer link plates, and a rubber track is fixed on the carrier plates, characterized in that: a distance between a bottom and top of said guide rail being greater than a distance between the inner link plates on two sides of rollers, and a maximum width of a part of the guide rail which extends between the inner link plates being less than a distance between the inner link plates.

3. The tracked dumping compartment according to claim 1, characterized in that: each said blocking plate further comprises a second angled section supporting the rubber track and an included angle between the second angled section and a bottom surface of the rubber track is 0° to 90°.

4. The tracked dumping compartment according to claim 1, characterized in that: the rubber track located anywhere below the angled sections and between the vertical sections comprises at least three overlapped rubber tracks, one end of any of the rubber tracks is fixed on a corresponding one of the carrier plates with screws, and a free end of the rubber tracks travels beyond the respective carrier plate which is two carrier plates away from the free end and is put on the carrier plate which is three carrier plates away from the free end as it moves over a top of the chain.

5. The tracked dumping compartment according to claim 3, characterized in that: a plurality of powerless short rollers supporting the rubber track are set on said second angled sections.

6. The tracked dumping compartment according to claim 1, characterized in that: a cross-section of said guide rail is in the shape of any of a circle, rectangle, isosceles triangle, isosceles trapezoid, pentagon, semi-oblong, semi-ellipse, spindle, and bullet.

7. A dump truck comprising the tracked dumping compartment as claimed in claim 1.

8. A dump truck comprising the tracked dumping compartment as claimed in claim 2.

* * * * *